(No Model.)　　　　　　　　　　　　　　　　　　2 Sheets—Sheet 1.
L. McGILVRAY.
MACHINE FOR MAKING CHAIN LINK BLANKS.
No. 298,220.　　　　　　　　　　　　　　Patented May 6, 1884.
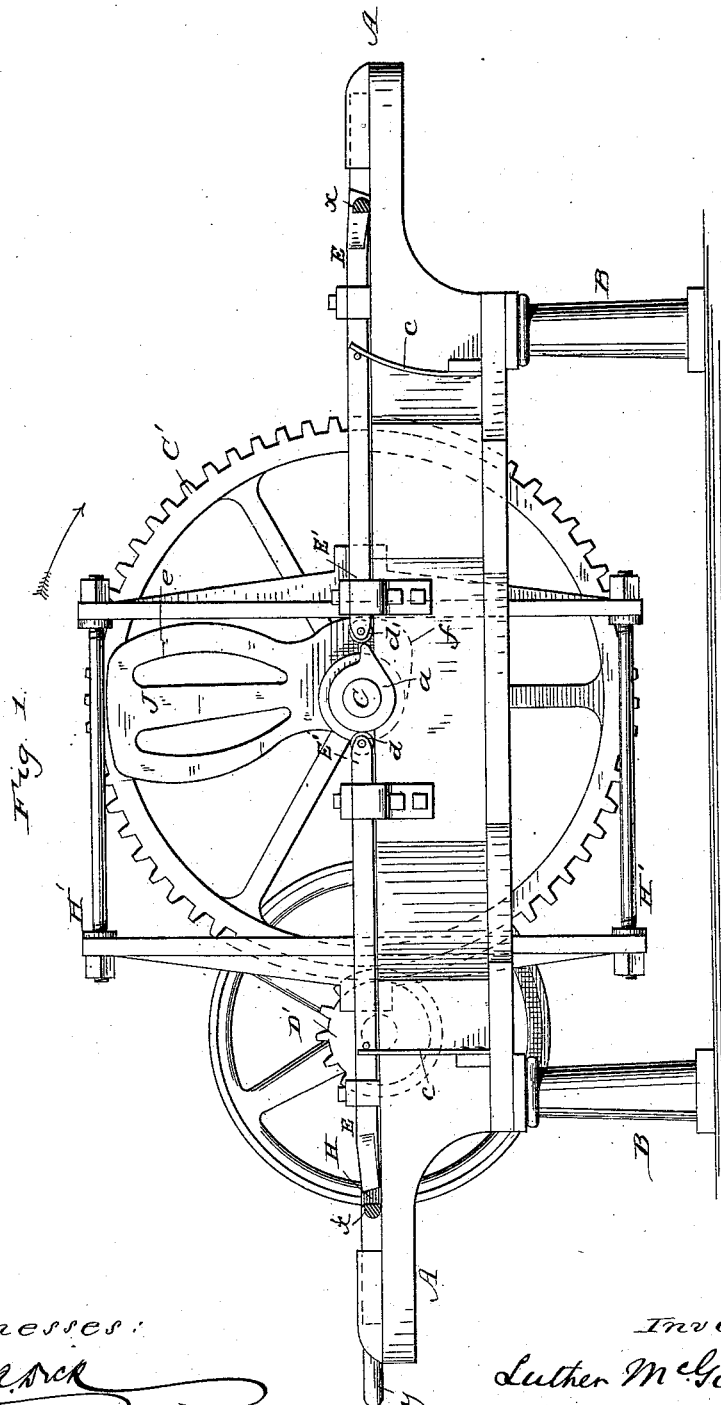

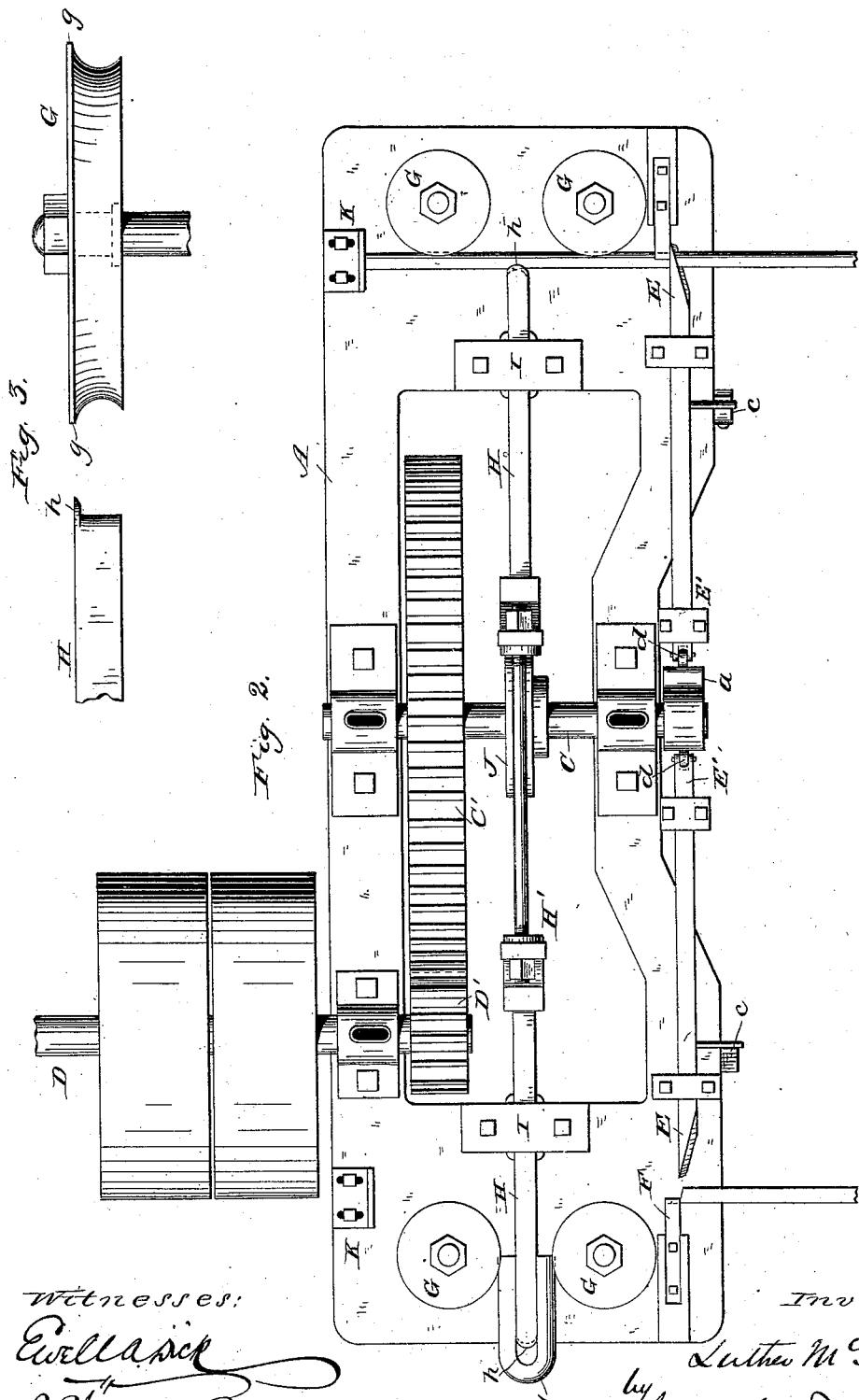

UNITED STATES PATENT OFFICE.

LUTHER McGILVRAY, OF GREENVILLE, PENNSYLVANIA.

MACHINE FOR MAKING CHAIN-LINK BLANKS.

SPECIFICATION forming part of Letters Patent No. 298,220, dated May 6, 1884.

Application filed December 20, 1883. (No model.)

*To all whom it may concern:*

Be it known that I, LUTHER MCGILVRAY, of Greenville, in the county of Mercer and State of Pennsylvania, have invented certain new and useful Improvements in Machines for Making Chain or Coupling-Link Blanks, of which the following is a specification.

Link-blanks for chains or couplings ordinarily have a U shape, and are usually made from a metal bar of proper length, which spans the space between two sheaves, and is bent and pushed between these sheaves by a ram or driver, which bears upon that portion of the bar intermediate between the sheaves. My improvements refer to a machine in which these instrumentalities are employed to bend the blank.

My improvements have relation, in the main, to the mechanism for actuating the driver or ram, the object being to so move the driver that while the part of the bar from which the link is to be made is being cut or severed from the main portion of the bar the driver will act to steady and hold this portion in place, and will then, after the severing operation is completed, act rapidly and effectively to bend the blank into proper U shape by forcing it through between the sheaves; and this mechanism is preferably so organized that it will operate two drivers at once—one at each end of the machine—each driver being combined with its own set of cutters or knives, &c., thus virtually making the machine a double machine, all the moving parts of which can be operated from one and the same cam-shaft.

My machine is designed to be used more particularly in connection with a bar-iron-rolling mill, the bar taken from the finishing-rolls being run through my machine and there converted into U-shaped link-blanks without necessitating its reheating.

The nature of my improvements and the manner in which the same are or may be carried into effect can best be explained and understood by reference to the accompanying drawings, in which—

Figure 1 is a side elevation of a machine embodying the several features of my invention. Fig. 2 is a plan of the same. Fig. 3 is a side elevation, on enlarged scale, of one of the sheaves and the end of the driver contiguous thereto.

The particular machine shown in the drawings in illustration of my invention is a "double-ender," there being at each end of the machine cutters or knives, sheaves, and a driver or ram, which are counterparts of one another.

A is the bed or table of the machine, supported by standards or other suitable support or foundation, B. Midway between the ends of the table, and supported in bearings or boxes thereon, is the main shaft C, from which the driven portions of the machine derive their movement. This shaft is driven by any convenient means—in this instance from the power-driven shaft D, provided with a pinion, D', which meshes with a spur-wheel, C', on shaft C. Upon the front end of shaft C is a cam, $a$, which I term the "knife-cam," and which operates the moving knives E. There are two of these knives. Each of them is adapted to slide to and fro in guides or boxes $b$. They are arranged on diametrically-opposite sides of the cam $a$, and the heels or butts E' of their stocks are held up against the cam by leaf or other springs, $c$, or their mechanical equivalents. With each moving knife is combined a bed-knife, F, which is made adjustable to and from its moving knife, and also from front to rear of the machine, so that its position may be varied according to the thickness and length of the blank or other conditions of the work. And I remark here that the boxes or guides of the moving knives are also adjustable from front to rear of the machine. The cam $a$ has a face of such width—usually four inches or more—that the knives can be adjusted to the requisite extent without affecting their operative connection with the cam. I have not deemed it necessary to show these adjusting devices in the drawings, inasmuch as they are of known construction and form no part of my invention.

To reduce friction so far as practicable, the heel of each moving knife-stock carries a small friction-roller, $d$, which bears against the periphery of cam $a$. The cutting-edges of the knives are shaped to conform to the contour of the edges or faces of the bar which they operate on. The particular form of bar shown in the drawings in illustration of my invention has a D cross-section, as seen at $x$, the curved face or edge being outermost or next the bed-knife.

Under the arrangement thus far described it will be seen that the cam operates the knives alternately, one knife being withdrawn or in retracted position at the time the other knife is advanced to make its cut.

To rear of each bed-knife is a pair of loose pulleys or sheaves, G, the distance between which should be about equal to the thickness of the two sides of the bent link-blank plus the thickness of the driver. With each pair of sheaves is combined a driver or ram, H, placed opposite the center of the space which separates the two sheaves, and adapted to reciprocate in a right line, being supported for this purpose in one or more guides or boxes, I, on the table A, through which it plays. These two drivers, like the moving knives already referred to, are arranged on opposite sides of the shaft C, and are operated by one and the same leaf-cam, J, on shaft C, which cam plays in a rectangular cam yoke or frame, H', to opposite sides of which the two drivers are respectively made fast. The cam-yoke is of such size and so proportioned that the leaf-cam J will operate only against its sides, and not against its top and bottom. The outer end of the leaf-cam which causes the drivers to bend and push the blank through between the sheaves is lettered e. In addition to this part, it has also a small swell or curve at the point f, which acts to impart to each driver in turn a slight forward movement at the time the knives are about to act, the object being to hold firmly in place against the sheaves by means of the driver that portion of the bar which is being cut off from the main body or stock. Thus in turn each driver is by the swell f advanced so as to clamp in place against the sheaves that portion of the bar from which the blank is to be made, and then, after the completion of the cutting operation, by the part e is quickly advanced to the full extent of its stroke, to bend and push this cut-off portion of the bar through between the sheaves, after which it at the proper time is withdrawn to its first position. With each set of knives, driver, and sheaves is combined a gage, K, adjustable back and forth, to regulate the length of that portion of the bar cut off from the main portion or stock.

With a view to prevent the blank from rising, the sheaves have peripheries which conform to the shape of that portion of the blank which comes in contact with them, and their top edges slightly overhang their bottom edges, as indicated at g, Fig. 3. For the same purpose each driver has at its outer end a horizontal projecting lip or flange, h, which projects over the top of the bar-blank. When in motion the shaft C revolves in the direction of the arrow in Fig. 1.

The operation of the machine as a whole is as follows: In the position in which the parts are shown in the drawings the bar at the right-hand end of the machine has been advanced by the workman until it abuts against the gage at the rear. The leaf-cam, by its swell f, has advanced the driver at that end of the machine against the bar, so as to hold it in place, and the knife-cam has just operated the right-hand knife to sever the blank-length from the bar. The knife, having made the cut, at once recedes as soon as its stock clears the point of the cam. Simultaneously with this—that is, as soon as the cut is made—the toe or outer end, e, of the leaf-cam operates on the cam yoke or frame H' and thrusts forward the right-hand driver, with the effect of causing the latter to buckle the severed blank-length into U form and to shove it through between and out beyond the sheaves. The U-formed blank is thus completed, and can be removed by any suitable means. The driver remains in this position until the leaf-cam, in its revolution, acts against the opposite side of the cam-yoke H', when by this action it is returned to its first position. While this series of operations are going on on the right of the machine, the following takes place on the left: In the position of parts shown in Figs. 1 and 2 the left-hand driver is still between the sheaves, the U-shaped blank previously formed by it being indicated at y. Simultaneously with the advance of the right-hand driver the left-hand driver is retracted, thus clearing the way for the passage of the bar, which is shoved back until it reaches its gage. As soon as the right-hand driver begins to withdraw, the left-hand driver begins to advance, and the same series of operations described with reference to the right-hand end of the machine now takes place at the left-hand end thereof. Thus at each end of the machine alternately a blank is completed, and all portions of the machine are actuated to move in proper relation to one another from one and the same cam-shaft, two link-blanks being made during each revolution of the latter. The acting edges of the knives are set so as to make a slanting or scarf cut, for the purpose of facilitating the subsequent operation of welding the two ends of the blank together in order to complete the link.

Owing to the form of the leaf-cam and cam-yoke, it will be noted that each driver is at rest a short time in its outermost or advanced position. This, however, is no disadvantage practically, inasmuch as the workman is enabled during this interval to advance the bar as far as the driver, where it is in position to be shoved back against the gage as soon as the driver recedes.

I remark that my improvement in the direction of the driver-operating mechanism can be applied, with only such changes as are obvious to the mechanic, to a machine having only one driver.

Having described my invention, what I claim as new, and desire to secure by Letters Patent, is—

1. The combination, with the cutting mechanism, the sheaves, and the reciprocating driver, of the driver-actuating mechanism, arranged and operating substantially as hereinbefore described, to cause said driver to clamp or hold the bar against the sheaves during the cutting operation, to push the severed bar-length through between the sheaves, and to then return to its original position, substantially as hereinbefore set forth.

2. The combination, with the cutting mechanism and the sheaves, of the reciprocating driver, the cam yoke or frame, and the rotary leaf-cam formed with the parts $e\,f$, as and for the purposes hereinbefore set forth.

3. The combination, with the two sets of knives or cutters, drivers, sheaves, and gages, of the cam-yoke H' and the rotating cam-shaft C, provided with the knife-cam, and the leaf-cam, arranged to operate both sets of instrumentalities in the manner and for the purposes hereinbefore set forth.

In testimony whereof I have hereunto set my hand this 14th day of December, 1883.

LUTHER McGILVRAY.

Witnesses:
EWELL A. DICK,
J. WALTER BLANDFORD.